United States Patent
Kakimoto et al.

(10) Patent No.: US 6,409,350 B1
(45) Date of Patent: Jun. 25, 2002

(54) LCD PROJECTOR

(75) Inventors: Yasuhiro Kakimoto; Toshiyuki Noguchi; Mitsuru Kotaka, all of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/623,412

(22) PCT Filed: Mar. 5, 1999

(86) PCT No.: PCT/JP99/01096

§ 371 (c)(1),
(2), (4) Date: Oct. 26, 2000

(87) PCT Pub. No.: WO99/45714

PCT Pub. Date: Sep. 10, 1999

(30) Foreign Application Priority Data

Mar. 6, 1998 (JP) ............................................. 10-54682
Sep. 11, 1998 (JP) .......................................... 10-258257

(51) Int. Cl.[7] ............................................. G03B 21/14
(52) U.S. Cl. ......................................... 353/85; 353/94
(58) Field of Search ..................... 353/85, 94; 315/225, 315/209 R (56) References Cited

U.S. PATENT DOCUMENTS

| | | | | |
|---|---|---|---|---|
| 3,914,645 A | * | 10/1975 | Li Donnici | 353/85 |
| 4,964,719 A | * | 10/1990 | Tachikawa et al. | 353/85 |
| 5,504,544 A | | 4/1996 | Dreyer et al. | 353/38 |
| 5,567,030 A | * | 10/1996 | Shin | 353/85 |
| 5,658,062 A | * | 8/1997 | Lee et al. | 353/85 |
| RE36,060 E | * | 1/1999 | Miyashita | 353/85 |

FOREIGN PATENT DOCUMENTS

| | | |
|---|---|---|
| DE | 196 21 911 | 12/1997 |
| EP | 0 801 507 | 10/1997 |
| EP | 0 888 016 | 12/1998 |
| JP | 1-213694 | 8/1989 |
| JP | 3-282418 | 12/1991 |
| JP | 5-313115 | 11/1993 |
| JP | 6-60833 | 8/1994 |
| JP | 7-56545 | 3/1995 |
| JP | 9-288272 | 11/1997 |
| WO | 95/20811 | 8/1995 |

\* cited by examiner

*Primary Examiner*—William Dowling
(74) *Attorney, Agent, or Firm*—Wenderoth, Lind & Ponack, L.L.P.

(57) ABSTRACT

An LCD projector (K1) comprising: a power source (20); an image data source (90) for producing an image data; a light source (30) which is able to provide different levels of power; an LCD panel (50) for modifying a light ray from the light source (30) in accordance with said image data to produce light rays of an image; a projecting lens (60) for projecting the light rays from the LCD panel (50) onto a screen (70) through enlargement; a control circuit (81) for controlling an output of the power source (20) so as to selectively set an output power: and a correcting circuit (100) for correcting an image data before being supplied to the LCD panel (50) so as to compensate the disturbance of the white balance caused by the change of the power of the light source (30).

13 Claims, 12 Drawing Sheets

| | | | |
|---|---|---|---|
| Lamp 1 | OK | -- | 1800 h |
| Lamp 2 | OK | ON | 1600 h |
| Lamp 3 | OK | ON | 1000 h |
| Lamp 4 | NG | -- | 2500 h |

| | | | |
|---|---|---|---|
| Lamp 1 | NG | -- | 1800 h |
| Lamp 2 | NG | -- | 1600 h |
| Lamp 3 | OK | ON | 1000 h |
| Lamp 4 | NG | -- | 2500 h |

LCD PROJECTOR

TECHNICAL FIELD

The present invention relates to a liquid crystal display (LCD) projector in which an output of a light source is set selectively.

BACKGROUND ART

Figure 14:
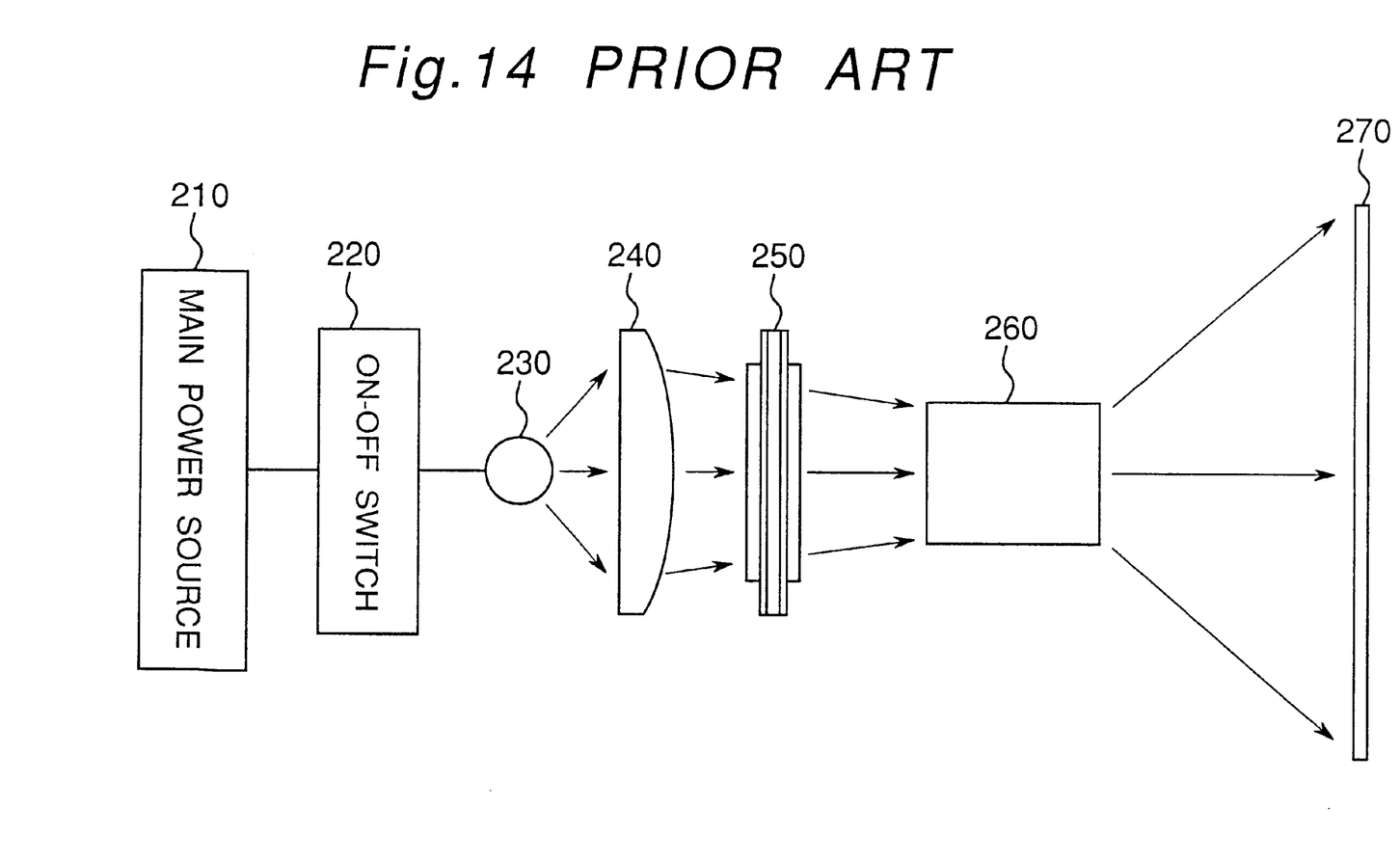
FIG. 14 is a schematic view of a prior art LCD projector.

An LCD projector is known from, for example, Japanese Patent Laid-Open Publication No. 5-313115 (1993). FIG. 14 shows a basic construction of this known LCD projector. In FIG. 14, a main power source 210 supplies electric power to an on-off switch 220 for turning on and off a light source 230. The known LCD projector further includes a condensing lens 240, an LCD panel 250 acting as an image forming member, a projecting lens system 260 and a screen 270.

A halogen lamp or the like is used as the light source 230. A light ray from the light source 230 not only is condensed but is converted into collimated rays by the condensing lens 240. The collimated rays are supplied from the condensing lens 240 to the LCD panel 250 in which an image is formed. Subsequently, the image of the LCD panel 250 is projected onto the screen 270 through enlargement by the projecting lens system 260 such that an enlarged image is formed on the screen 270.

Figure 15:
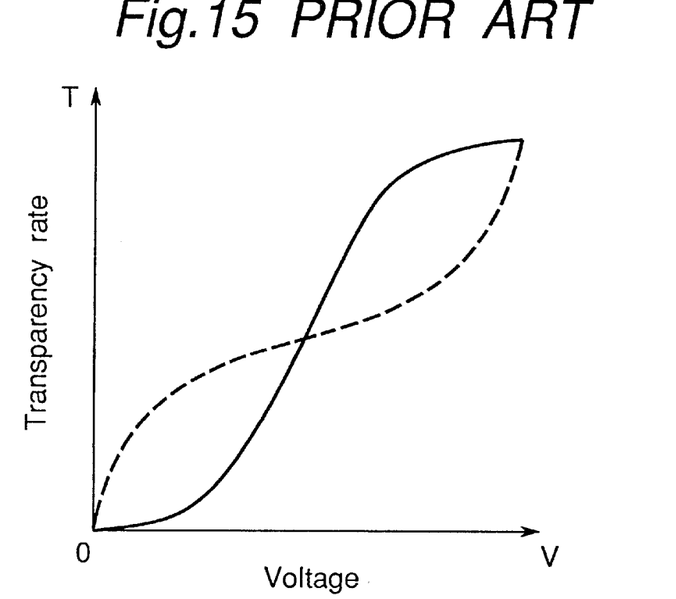
FIG. 15 is a graph showing relation between voltage and transparency in an LCD panel of the prior art LCD projector of FIG. 14.

As the voltage is applied across the thickness direction of the LCD panel 250, the rate of transparency T varies in an S curve as shown in FIG. 15.

Generally, in an LCD projector, it is often desirable to change luminance of a light source in accordance with its user's preference or brightness of a room in which the LCD projector is installed. For example, if luminance of the light source is reduced in accordance with the factors referred to above, service life of the light source can be lengthened as compared with a case in which the light source is driven at its maximum luminance at all times.

Figure 16:
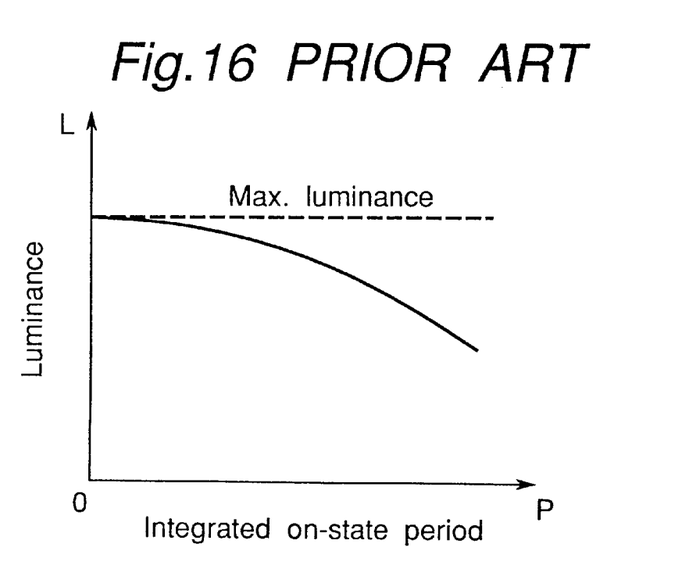
FIG. 16 is a graph showing relation between integrated-on state period and luminance in a light source of the prior art LCD projector of FIG. 14.

However, in the known LCD projector of FIG. 14, it is impossible to change luminance of the light source 230. Namely, in this known LCD projector, since the light source 230 is driven at its maximum luminance at all times, luminance of the light source 230 gradually drops merely upon lapse of integrated on-state period of the light source 230 as shown in FIG. 16. Therefore, the known LCD projector has such disadvantages that service life of the light source 230 is short and electric power consumed by the known LCD projector is large.

DISCLOSURE OF INVENTION

Accordingly, an object of the present invention is to provide an LCD projector in which service life of a light source is lengthened and electric power consumed by the LCD projector is saved.

In order to accomplish this object of the present invention, an LCD projector according to the present invention comprises: a power source; an image data source for producing an image data; a light source which is able to provide different levels of power; an LCD panel for modifying a light ray from the light source in accordance with said image data to produce light rays of an image; a projecting lens for projecting the light rays from the LCD panel onto a screen through enlargement; a control circuit for controlling an output of the power source so as to selectively set an output power: and a correcting circuit for correcting an image data before being supplied to the LCD panel so as to compensate the disturbance of the white balance caused by the change of the power of the light source.

The correcting circuit further corrects said image data so as to compensate the light intensity change caused by the intrinsic transparency characteristics of the LCD panel.

In accordance with the present invention, since luminance of the light source is changed in accordance with a user's preference or brightness of a room in which the LCD projector is installed, service life of the light source can be lengthened and electric power consumed by the LCD projector can be saved.

BEST MODE FOR CARRYING OUT THE INVENTION

Figure 1:
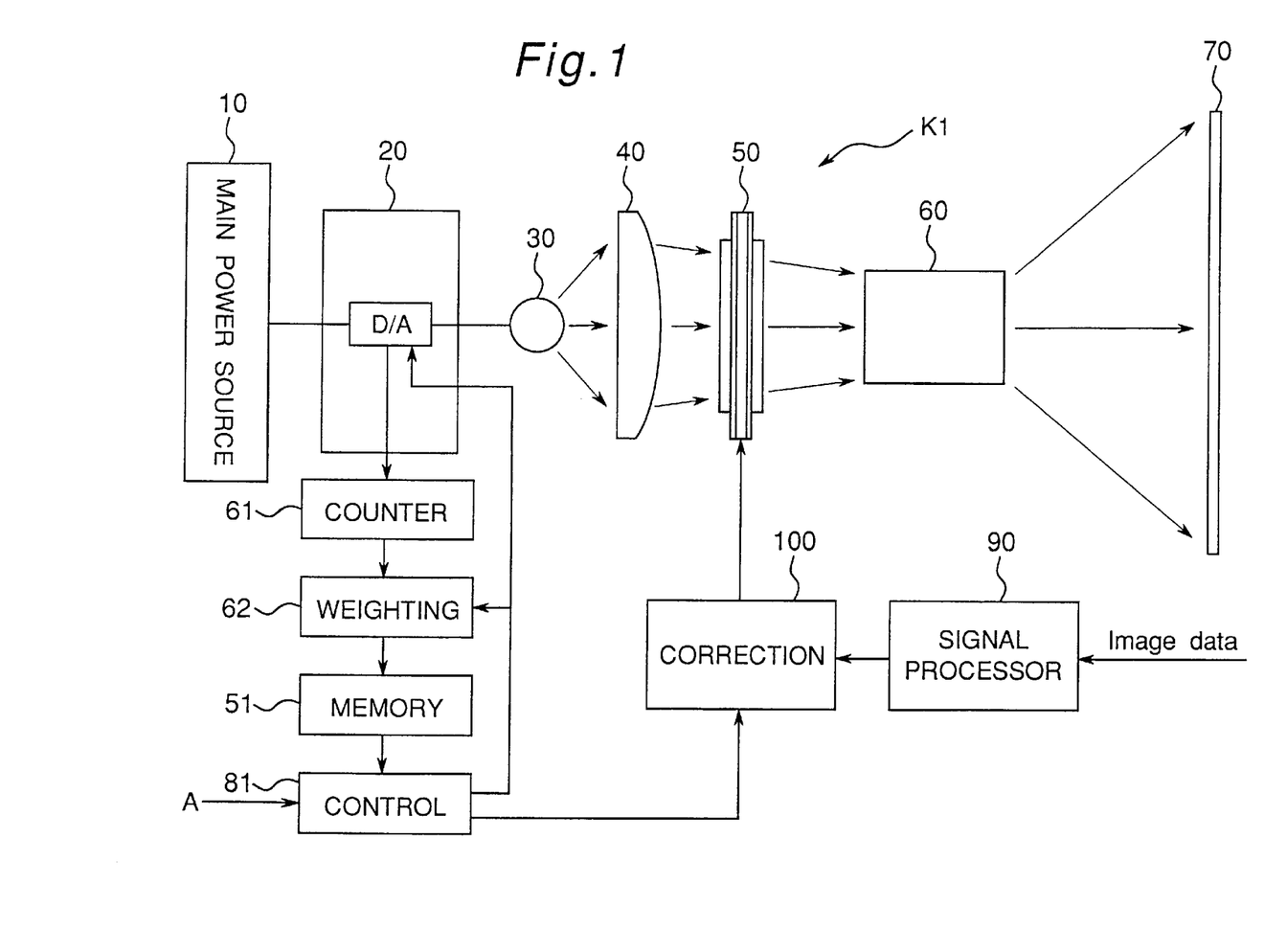
FIG. 1 is block diagram of an LCD projector according to a first embodiment of the present invention.

FIG. 1 shows an LCD projector K1 according to a first embodiment of the present invention. In the same manner as a prior art LCD projector of FIG. 14, the LCD projector K1 includes a main power source 11, a secondary power source 20, a light source 30 driven by the secondary power source 20, a condensing lens 40, an LCD panel 50 acting as an image forming member, a projecting lens system 60 and a screen 70. The light source 30 is formed by a luminescent lamp, e.g., a mercury vapor lamp.

The LCD projector K1 further includes a signal processor 90 and a correcting circuit 100 for correcting output of the LCD panel 50. Furthermore, the LCD projector K1 includes a counter 61 for counting integrated on-state period of the light source 30 via the secondary power source 20 and a memory 51 for storing the integrated on-state period of the light source 30 counted by the counter 61. The LCD projector K1 further includes a control circuit 81. The counter 61 is connected to the secondary power source 20 and the memory 51, while the memory 51 is, in turn, connected to the control circuit 81.

According to a preferred embodiment, a weighting circuit 62 is provided between the counter 61 and the memory 51. The counter 61 counts the time elapsed during the turn-on time of the power supplied to the light source 30 and the weighting circuit 62 puts weight on the counting value relatively to the power supplied to the light source 30. For example, when the light source 30 is supplied with the full power (as requested by a signal A) from the secondary power source 20, the increment of the count is weighted by 1. For example, when the light source 30 is supplied with 50% of the full power (as requested by the signal A) from the secondary power source 20, the increment of the count is weighted by 0.5.

The main power source 10 supplies electric power to the secondary power sources 20. The secondary power source 20 includes a voltage controller such as a D/A converter to selectively change the voltage supplied to the light source 30. The secondary power source 20 converts the electric power supplied by the main power source 11 into optimum electric power for driving the light source 30 and supplies the optimum electric power to the light source 30. A light ray from the light source 30 not only is condensed but is converted into collimated rays by the condensing lens 40. The collimated rays are supplied from the condensing lens 40 to the LCD panel 50 in which an image is formed. Subsequently, the image of the LCD panel 50 is projected onto the screen 70 through enlargement by the projecting lens system 60 such that an enlarged image is formed on the screen 70.

Figure 2:
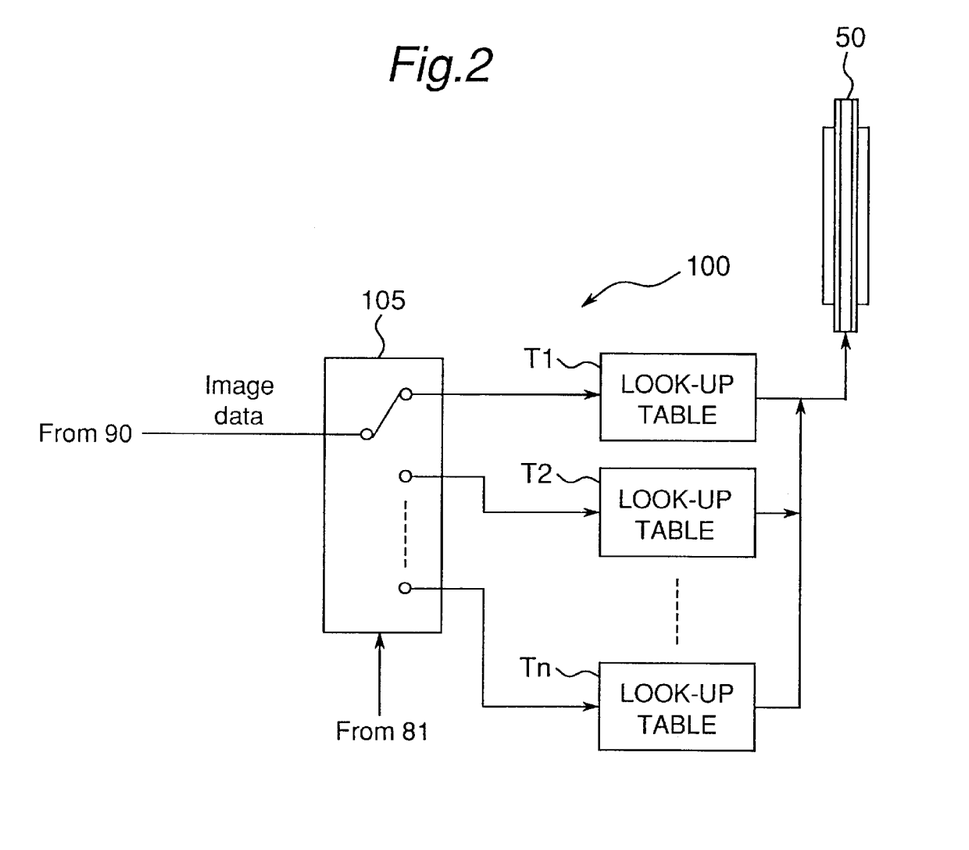
FIG. 2 is a block diagram of a correcting circuit employed in the LCD projector of FIG. 1.

Image data inputted to the LCD projector K1 is subjected to signal processing by the signal processor 90 and then, is applied to the correcting circuit 100. As shown in FIG. 2, the correcting circuit 100 includes a plurality of look-up tables T1 to Tn and a changeover switch 105 for effecting changeover of the look-up tables T1 to Tn. Each of the look-up tables T1 to Tn is formed by a read-only memory (ROM). In the correcting circuit 100, it is to be noted here that an arrangement including the look-up tables T1 to Tn and the changeover switch 105 is provided for each of three primary colors R, G and B but only one arrangement of the look-up tables T1 to Tn and the changeover switch 105 is illustrated in FIG. 2 for the sake of brevity.

In response to a signal A on at which luminance the light source 30 should be set, the control circuit 81 produces a voltage control signal which is digital data and is supplied to the secondary power source 20. In the secondary power source 20, the voltage to be supplied to the light source 30 is changed in accordance with the voltage control signal. Thus, the luminance of the light source 30 is changed accordingly. The signal A is produced based on a user's preference by manually operating a remote control unit or the like but may also be produced automatically by a sensor for detecting brightness of a room in which the LCD projector K1 is installed. Meanwhile, if luminance of the light source 30 is changed, such inconveniences are incurred that white balance is disturbed and components of three primary colors R, G and B in output of the light source 30 deviate from an appropriate ratio. In order to eliminate these inconveniences, the correcting circuit 100 corrects such deviations as will be explained below.

The LCD panel 50 receives generally uniform light rays from the light source 30 and also receives image data from the correcting circuit 100. In the LCD panel 50, the light rays from the light source 30 are modified in accordance with the image data received from the correcting circuit 100 to produce light rays of the image.

According to the present invention, the correcting circuit 100 corrects the image data in two different aspects: the first aspect is to correct the intrinsic transparency characteristics (real line in FIG. 15) of the LCD panel 50; and the second aspect is to compensate the disturbance of the appropriate white balance caused by the change of the power of the light source 30.

The correction according to the first aspect is to change the image data in accordance with the dotted curve line shown in FIG. 15 so as to compensate the light intensity change caused by the intrinsic transparency characteristics of the LCD panel 50 and to present a linear relationship between the voltage applied to the LCD panel 50 and the transparency.

Figure 3:
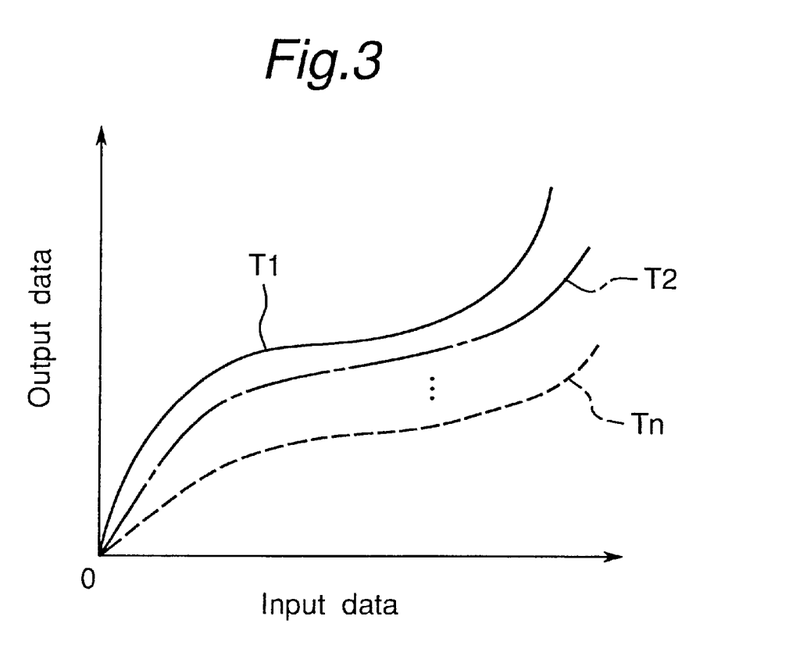
FIG. 3 is a graph showing characteristic curves of look-up tables of the correcting circuit of FIG. 2.
Figure 4:
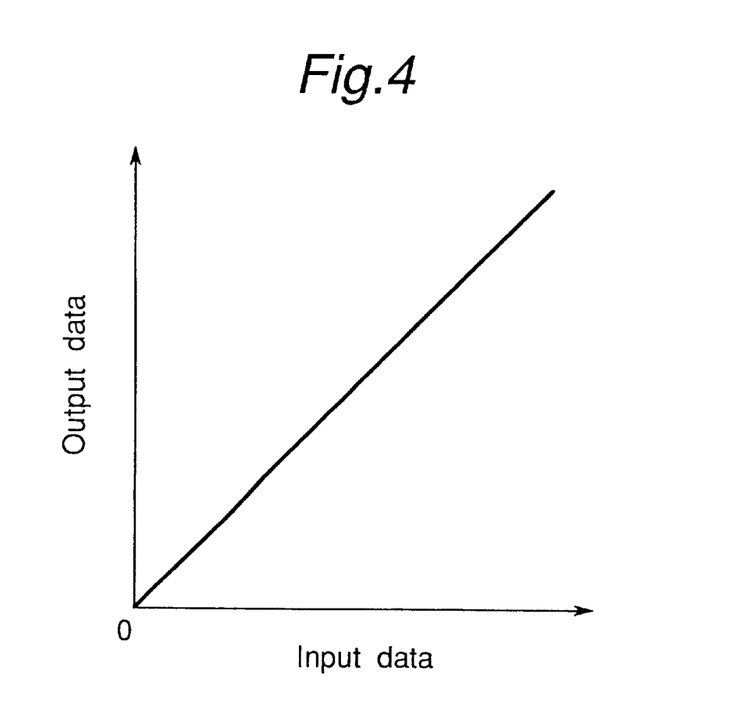
FIG. 4 is a graph showing relation between input data and output data of an LCD panel employed in the LCD projector of FIG. 1.

The correction according to the second aspect is to change the image data in accordance with the dotted line or dot-dash line shown in FIG. 3 so as to compensate the disturbance of the appropriate white balance caused by the change of the power of the light source 30. The change of the power of the light source 30 eventually changes the color of the light source 30, so that the white balance of the uniform light impinging on the LCD panel 50 is disturbed to show, for example, greenish light rays or reddish light rays, depending on the power supplied to the light source 30.

The correction degree regarding the first aspect can be expressed as $\Delta C1$ and the correction degree regarding the second aspect can be expressed as $\Delta C2$. Thus, when the total correction degree is expressed as C, the following relationship is obtained.

$$C = \Delta C1 \times \Delta C2$$

The correction degree $\Delta C1$ is constant as long as the same LCD panel 50 is used. However, the correction degree $\Delta C2$ varies according to the change of the power applied to the light source 30. Thus, according to the present invention, a number of look-up tables T1, T2, - - -, Tn are provided to accomplish the correction for different voltages applied to the light source 30. For example, the look-up table T1 is provided for a case when the light source 30 is produces light rays with no disturbance in the white balance. In this case, $\Delta C2$ may be equal to 1. The look-up table T2 is provided, for example, for a case when the light source 30 produces greenish light rays. In this case, $\Delta C2$ may be equal to 0.8 during impinging of green light rays. The look-up table Tn is provided, for example, for a case when the light source 30 produces reddish light rays. In this case, $\Delta C2$ may be equal to 0.9 during impinging of red light rays.

Figure 6:
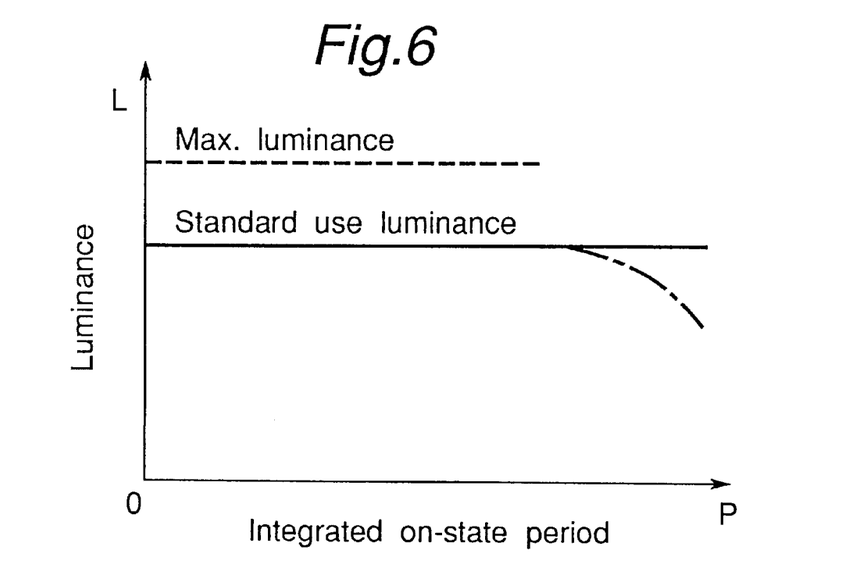
FIG. 6 is a graph showing relation between integrated on-state period and luminance in the light source of FIG. 5.

If the light source 30 is driven at its maximum luminance at all times, luminance of the light source 30 gradually drops upon lapse of integrated on-state period of the light source 30 as shown in FIG. 16. Thus, service life of the light source 30 is shortened. However, according to the present invention, the LCD projector K1 has a control circuit 81 which controls the secondary power source 20 to provide a voltage to the light source 30 to generally illuminate at a level (standard use luminance) lower than the maximum luminance as shown in FIG. 6. Thus, the service life of the light source 30 can be extended compared to the case shown in FIG. 16. Also the voltage supplied to the light source 30 can be reduced from the very beginning of the use of the LCD projector K1.

After a certain period of use, the efficiency of the light source may be reduced as shown by a dot-dash line in FIG.

Figure 5:
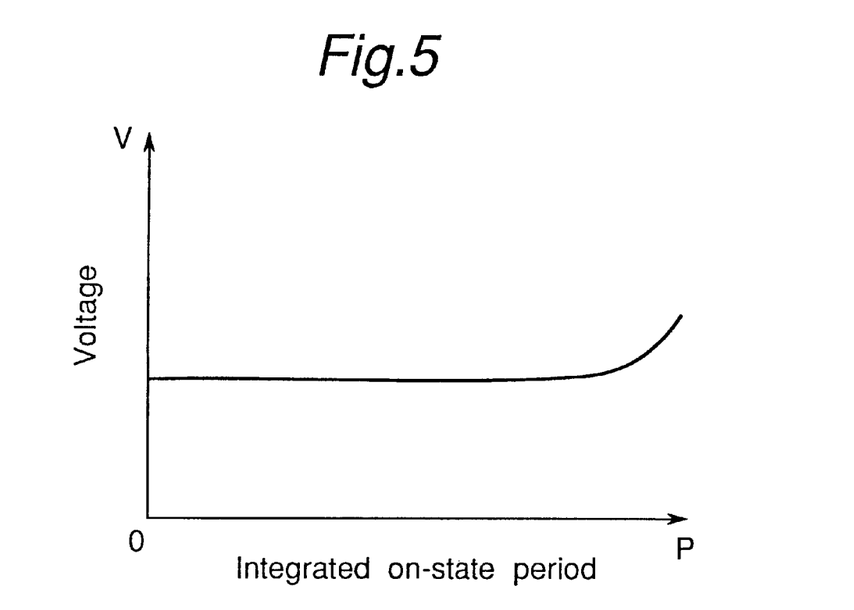
FIG. 5 is a graph showing relation between integrated-on state period and voltage in a light source of the LCD projector of FIG. 1.

6 due to the aging. If such a reduction of the efficiency takes place, the voltage supplied to the light source 30 is increased as shown in FIG. 5 by the control of the control circuit 81 to maintain the standard use luminance at a constant level. Therefore, the light source 30 is maintained at a standard use luminance lower than a maximum luminance as shown in FIG. 6.

Consequently, in the LCD projector K1, since luminance of the light source 30 is changed in accordance with the user's preference or brightness of the room in which the LCD projector K1 is installed, service life of the light source 30 can be lengthened and electric power consumed by the LCD projector K1 can be saved.

Figure 7:
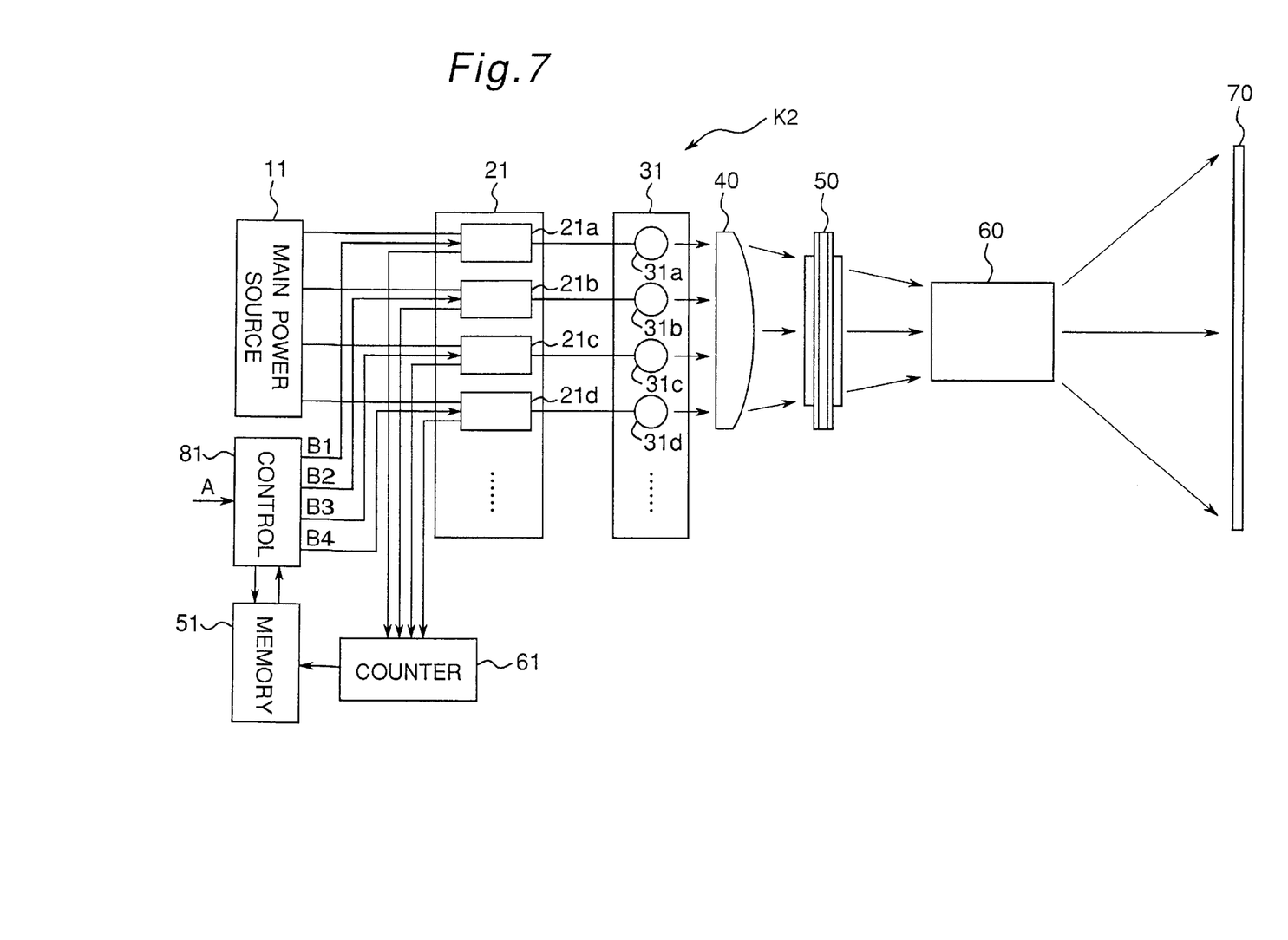
FIG. 7 is a block diagram of an LCD projector according to a second embodiment of the present invention.

FIG. 7 shows an LCD projector K2 according to a second embodiment of the present invention. In the same manner as the LCD projector K1, the LCD projector K2 includes the condensing lens 40, the LCD panel 50, the projecting lens system 60, the screen 70, the counter 61, the memory 51 and the control circuit 81. The LCD projector K2 further includes a main power source 11, a secondary power source unit 21 having a plurality of secondary power sources $21a$ to $21d$ each of which is an ON-OFF switch, and a light source unit 31 having a plurality of light sources $31a$ to $31d$ driven by the secondary power sources $21a$ to $21d$, respectively. The counter 61 counts integrated on-state periods of the light sources $31a$ to $31d$ via the secondary power sources $21a$ to $21d$, respectively and the memory 51 stores the integrated on-state periods of the light sources $31a$ to $31d$ counted by the counter 61. The secondary power sources $21a$ to $21d$ are, respectively, connected to the light sources $31a$ to $31d$.

Meanwhile, the secondary power sources $21a$ to $21d$ receive respective control signals B1 to B4 from the control circuit 81 such that supply of the optimum electric power to the light sources $31a$ to $31d$ by the secondary power sources $21a$ to $21d$ is subjected to on-off control by the control signals B1 to B4. When the light sources $31a$ to $31d$ are turned on, a signal A on how many ones of the light sources $31a$ to $31d$ should be turned on is produced based on a user's preference by manually operating a remote control unit or the like and is inputted to the control circuit 81. The control circuit 81 produces the control signals B1 to B4 on the basis of the signal A and transmits the control signals B1 to B4 to the power sources $21a$ to $21d$, respectively.

In this embodiment, the user produces the signal A based on his preference by manually operating the remote control unit or the like as described above but the signal A may also be produced automatically by a sensor for detecting brightness of a room in which the LCD projector K2 is installed.

Figure 8:
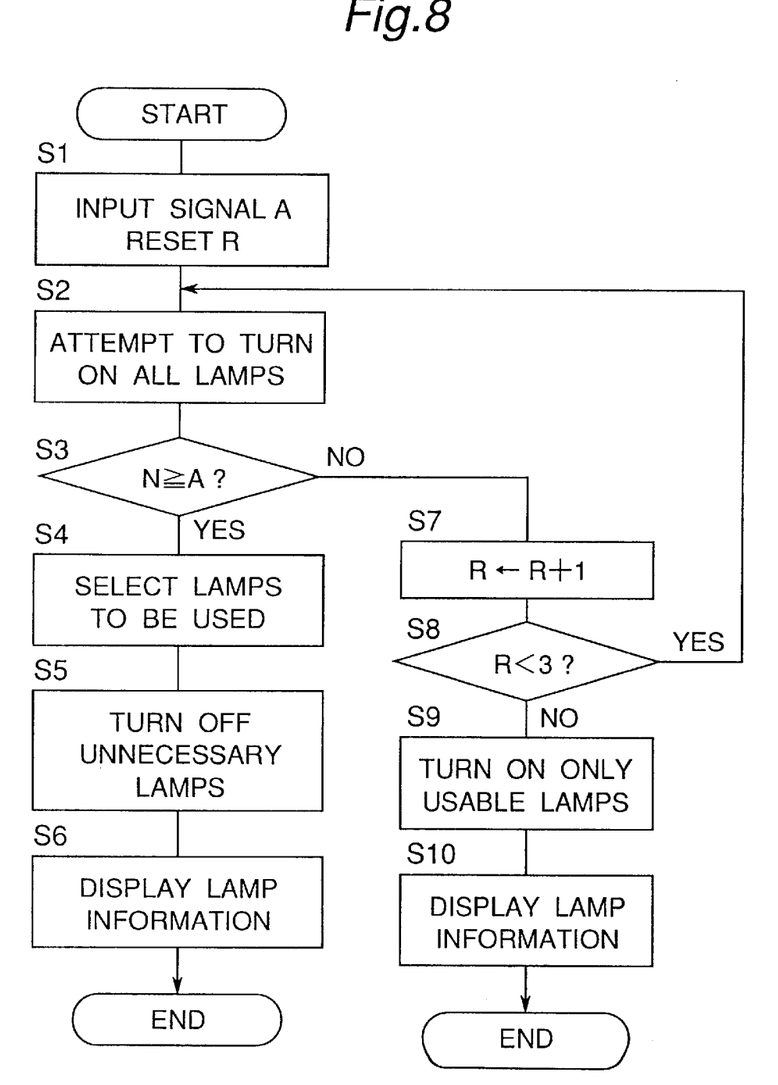
FIG. 8 is a flowchart showing operational sequence of the LCD projector of FIG. 7.
Figure 9:
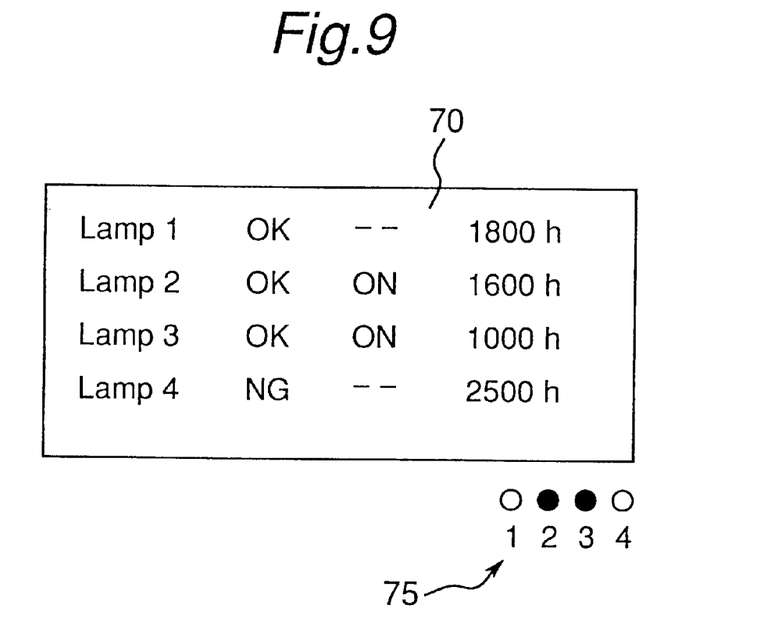
FIG. 9 is a view showing information displayed on a screen of the LCD projector of FIG. 7.

Hereinafter, operational sequence of the LCD projector K2 of the above described arrangement is described with reference to a flowchart of FIG. 8. Initially at step S1, the signal A on how many ones of the light sources $31a$ to $31d$ should be turned on is inputted to the control circuit 81 and the number R of retrials for turning on all the light sources $31a$ to $31d$ is reset. By way of example, it is assumed here that the signal A commands that two of the light sources $31a$ to $31d$ should be turned on. Then, at step S2, all the light sources $31a$ to $31d$ are supplied with power from the secondary power sources $21a$ to $21d$. Subsequently, at step S3, it is judged whether or not the number "N" of usable ones of the light sources $31a$ to $31d$ is larger than or equal to the numeral "2" designated by the signal A. In the case of "YES" at step S3, it is selected by priority in increasing order of the integrated on state periods of the light sources $31a$ to $31d$ which ones of the light sources $31a$ to $31d$ should be used at step S4. Then, at step S5, unnecessary ones of the light sources $31a$ to $31d$ are turned off. Thereafter, at step S6, information on the light sources $31a$ to $31d$ is displayed on the screen 70 as shown in, for example, FIG. 9. In FIG. 9, characters "Lamps 1 to 4" represent the light sources $31a$ to $31d$ having integrated on-state periods of 1,800, 1,600, 1,000 and 2,500 hours, respectively. Meanwhile, characters "OK" denote that the corresponding light source is usable and characters "NG" denote that the corresponding light source is defective, while characters "ON" denote that the corresponding light source is in ON state. Furthermore, in FIG. 9, since a display portion 75 having lamps 1 to 4 corresponding to the light sources $31a$ to $31d$, respectively is provided beside the screen 70, display on the screen 70 may not be performed in accordance with the user's preference. In FIG. 9, since the screen 70 displays that the light sources $31b$ and $31c$ are in ON state, the lamps 2 and 3 corresponding to the light sources $31b$ and $31c$, respectively, are turned on in the display portion 75.

Figure 10:
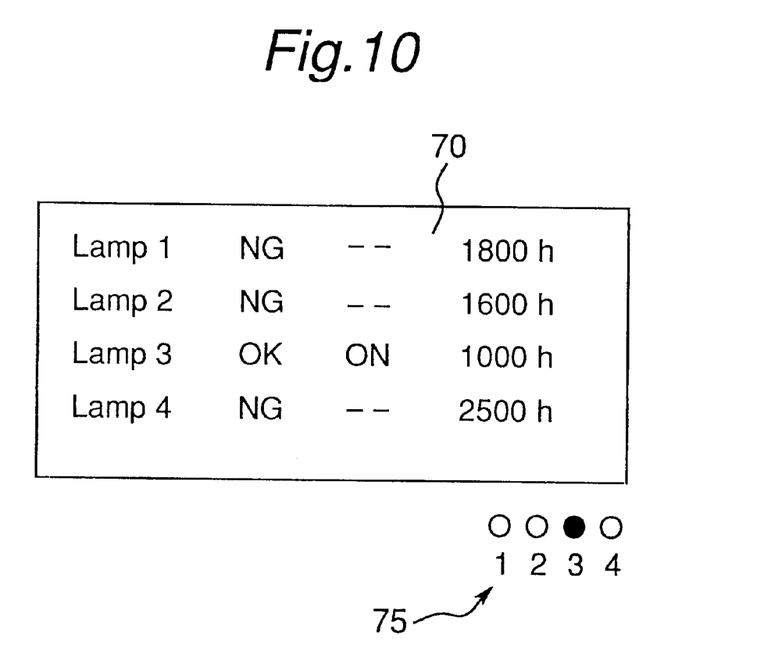
FIG. 10 is a view showing another information displayed on the screen of FIG. 9.

On the other hand, in the case of "NO" at step S3, the program flow proceeds to. step S7 at which "1" is added to the number R of retrials. Then, at step S8, it is judged whether or not the number R of retrials is smaller than a predetermined number of, for example, 3. In the case of "YES" at step S8, the program flow returns to step S2. On the contrary, in the case of "NO" at step S8, only the usable ones of the light sources $31a$ to $31d$ are turned on at step S9. Then, at step S10, information on the light sources $31a$ to $31d$ is displayed on the screen 70 by only the usable ones of the light sources $31a$ to $31d$, for example, by only the light source $31c$ as shown in FIG. 10. In FIG. 10, since the screen 70 displays that only the light source $30c$ is in ON state, only the lamp 3 corresponding to the light source $31c$ is turned on in the display portion 75.

In the LCD projector K2, since all the light sources $31a$ to $31d$ are initially turned on by the secondary power sources $21a$ to $21d$, respectively, maximum luminance of the LCD projector K2 can be secured. In addition, at this time, since it is proved which ones of the light sources $31a$ to $31d$ are defective, subsequent erroneous selection of the defective ones of the light sources $31a$ to $31d$ can be prevented and information on which ones of the light sources $31a$ to $31d$ are defective can be displayed on the screen 70 by the remaining ones of the light sources $31a$ to $31d$ and the display portion 75.

Furthermore, in the LCD projector K2, the integrated on-state periods of the light sources $31a$ to $31d$ are counted by the counter 61 and are stored in the memory 51 such that combination of some of the light sources $31a$ to $31d$ to be used is changed by priority in increasing order of the integrated on-state periods of the light sources $31a$ to $31d$ by the control circuit 81.

Consequently, in the LCD projector K2, since the light sources $31a$ to $31d$ are turned on selectively in accordance with the user's preference or brightness of the room in which the LCD projector K2 is installed, service life of the light sources $31a$ to $31d$ can be lengthened and electric power consumed by the LCD projector K2 can be saved.

Figure 11:
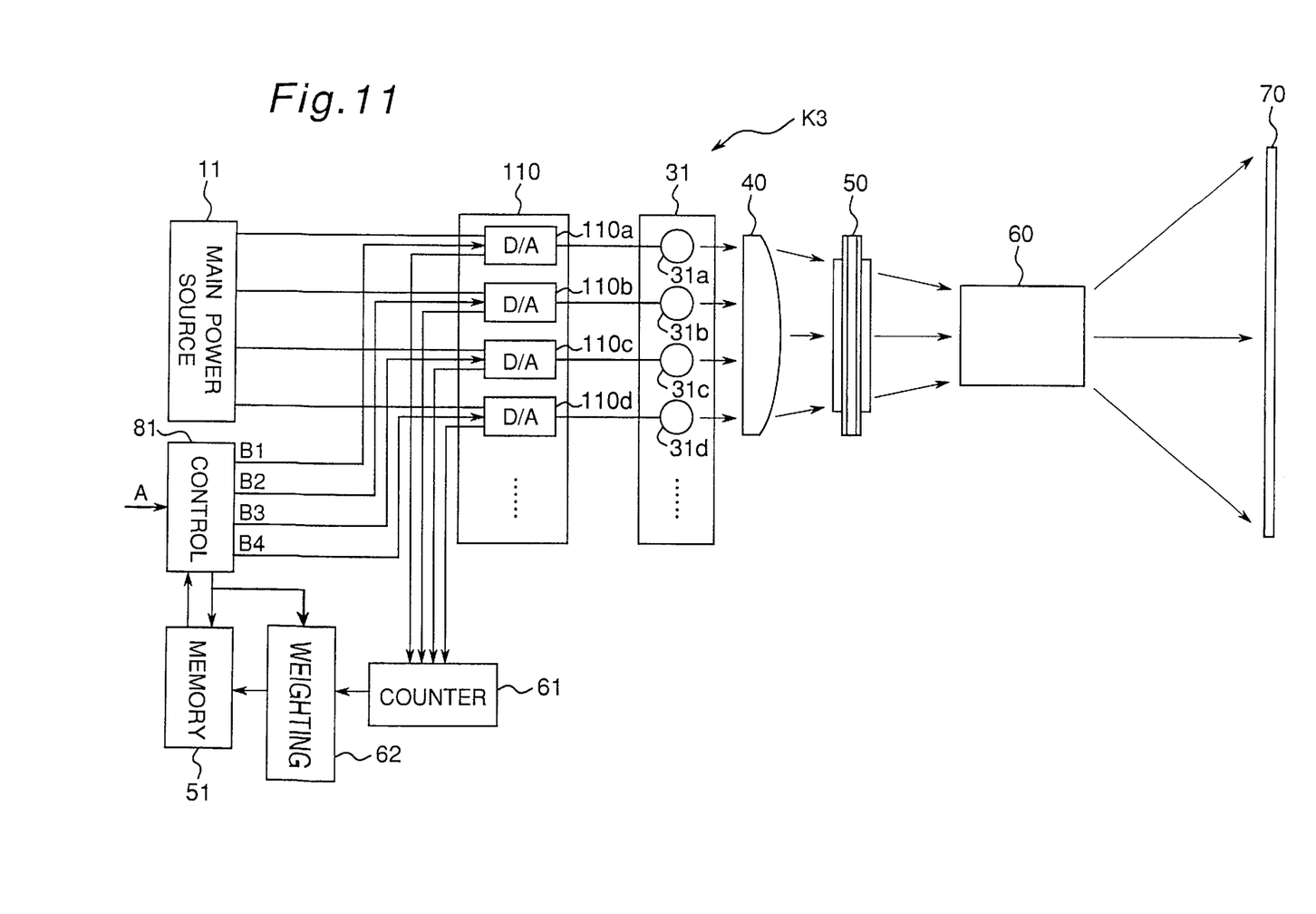
FIG. 11 is a block diagram of an LCD projector according to a third embodiment of the present invention.

FIG. 11 shows an LCD projector K3 according to a third embodiment of the present invention. In the LCD projector K3, the secondary power source unit 21 is replaced in the LCD projector K2 by a D/A converter unit 110 having a plurality of D/A converters $110a$ to $110d$. Since other constructions of the LCD projector K3 are the same as those of the LCD projector K2, the description is abbreviated for the sake of brevity.

In the LCD projector K3, the main power source 11 supplies electric power to the D/A converters $110a$ to $110d$. The electric power supplied by the main power source 11 is applied to each of the D/A converters 110a to 110d. Thus, according to the control signals B1, B2, B3 and B4, which are digital data, the voltage produced from the D/A converters 110a to 110d varies and in turn, the luminance of the light sources 31a to 31d changes.

Therefore, in the LCD projector K3, luminance of each of the light sources 31a to 31d is changed by each of the D/A converters 110a to 110d and combination of some of the light sources 31a to 31d to be used is changed by priority in increasing order of integrated on-state periods of the light sources 31a to 31d by the control circuit 81.

Consequently, in the LCD projector K3, since not only luminance of each of the light sources 31a to 31d is changed but the light sources 31a to 31d are turned on selectively in accordance with a user's preference or brightness of a room in which the LCD projector K3 is installed, service life of the light sources 31a to 31d can be lengthened and electric power consumed by the LCD projector K3 can be saved.

Figure 12:
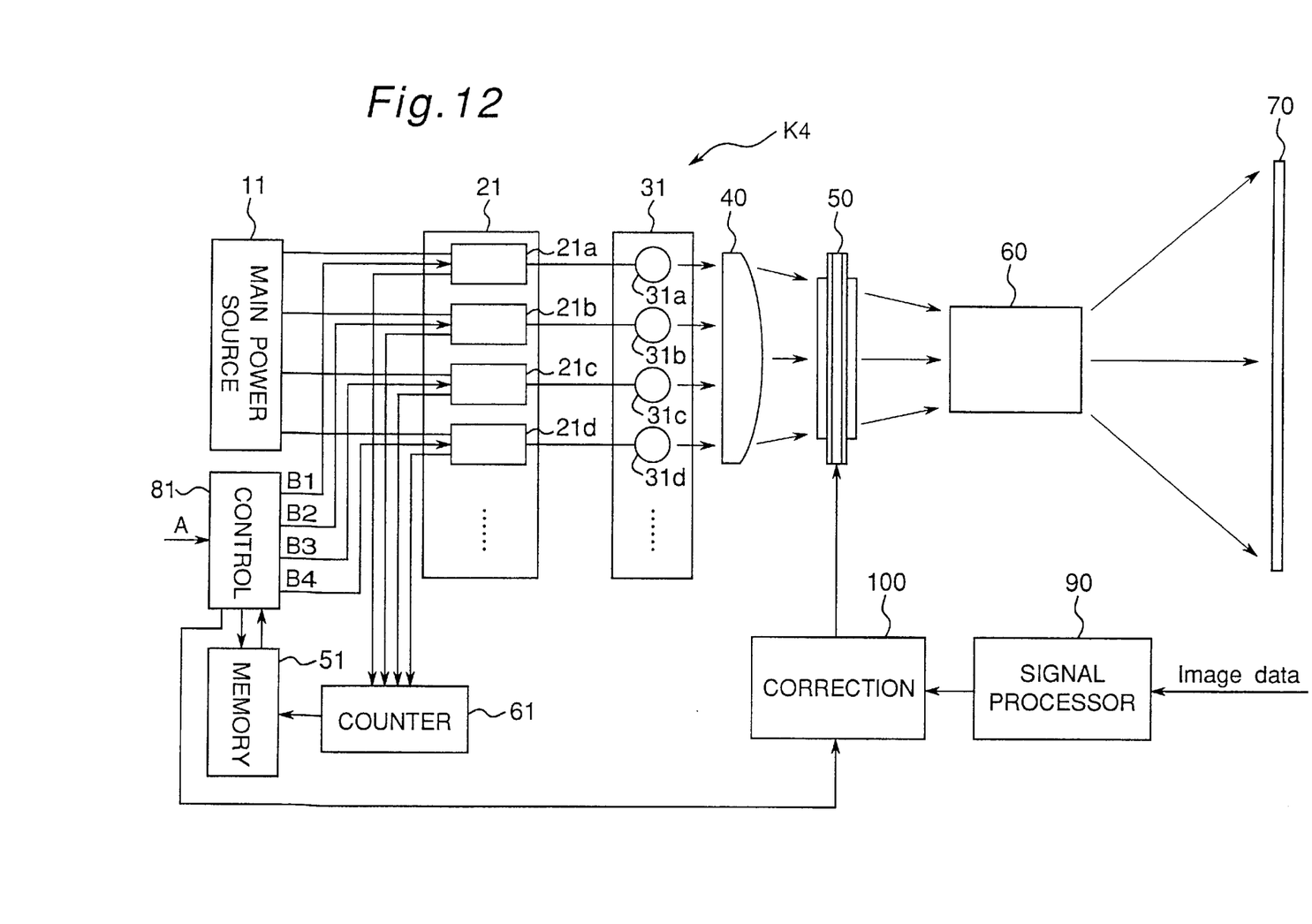
FIG. 12 is a block diagram of an LCD projector according to a fourth embodiment of the present invention.

FIG. 12 shows an LCD projector K4 according to a fourth embodiment of the present invention. The LCD projector K4 has an arrangement in which the signal processor 90 and the correcting circuit 100 of the LCD projector K1 is provided in the LCD projector K2. Since other constructions of the LCD projector K4 are the same as those of the LCD projector K2, the description is abbreviated for the sake of brevity. Therefore, in the LCD projector K4, output of the LCD panel 50 is corrected by the correcting circuit 100 and combination of some of the light sources 31a to 31d to be used is changed by priority in increasing order of integrated on-state periods of the light sources 31a to 31d by the control circuit 81.

Accordingly, in the LCD projector K4, since the light sources 31a to 31d are turned on selectively in accordance with a user's preference or brightness of a room in which the LCD projector K4 is installed, service life of the light sources 31a to 31d can be lengthened and electric power consumed by the LCD projector K4 can be saved.

Figure 13:
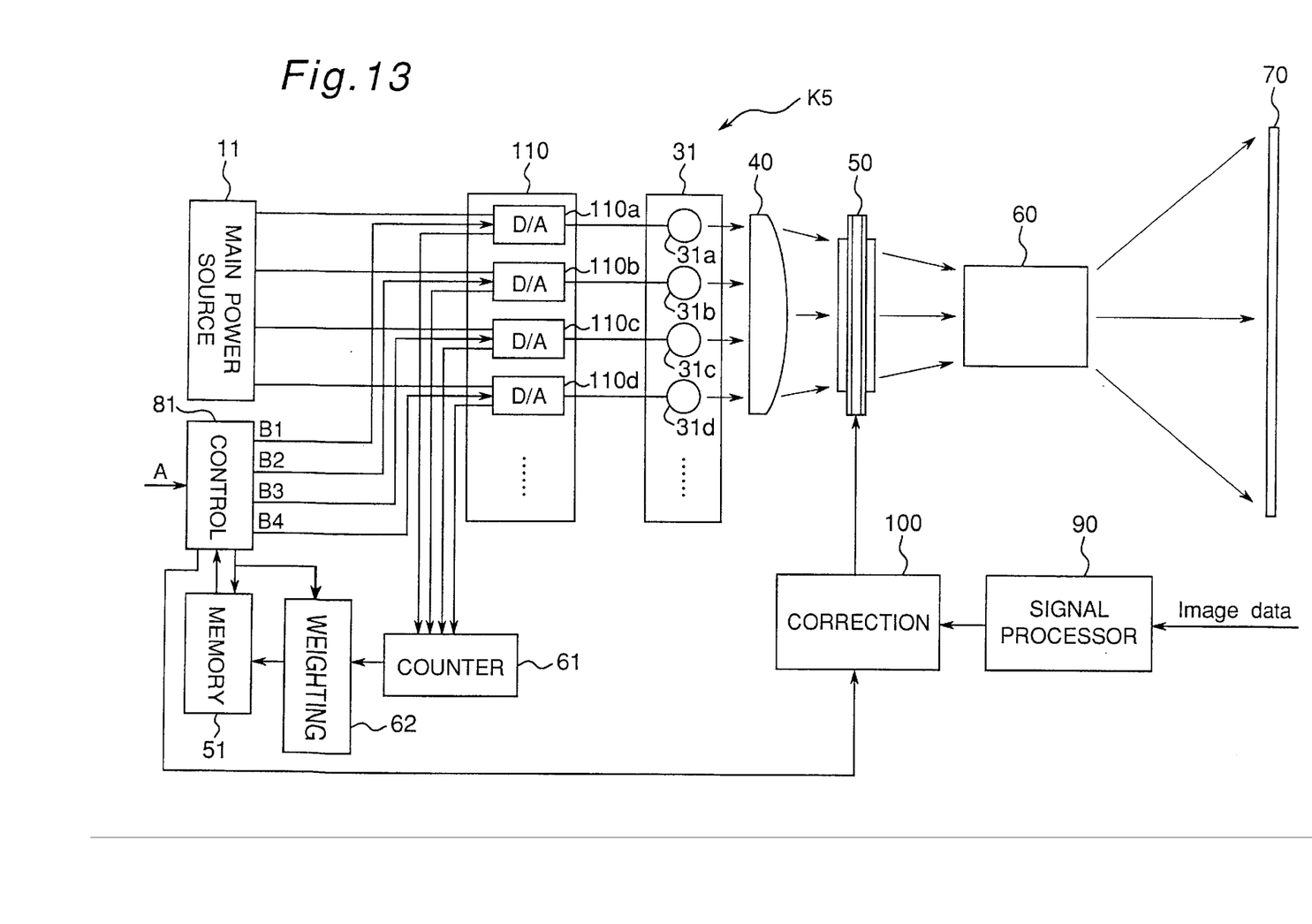
FIG. 13 is a block diagram of an LCD projector according to a fifth embodiment of the present invention.

FIG. 13 shows an LCD projector K5 according to a fifth embodiment of the present invention. The LCD projector K5 has an arrangement in which the signal processor 90 and the correcting circuit 100 of the LCD projector K1 is provided in the LCD projector K3. Since other constructions of the LCD projector K5 are the same as those of the LCD projector K3, the description is abbreviated for the sake of brevity. Therefore, in the LCD projector K5, luminance of each of the light sources 31a to 31d is changed by each of the D/A converters 110a to 110d and output of the LCD panel 50 is corrected by the correcting circuit 100. Furthermore, combination of some of the light sources 31a to 31d to be used is changed by priority in increasing order of integrated on-state periods of the light sources 31a to 31d by the control circuit 81.

Accordingly, in the LCD projector K5, since not only luminance of each of the light sources 31a to 31d is changed but the light sources 31a to 31d are turned on selectively in accordance with a user's preference or brightness of a room in which the LCD projector K5 is installed, service life of the light sources 31a to 31d can be lengthened and electric power consumed by the LCD projector K5 can be saved.

What is claimed is:

1. An LCD projector comprising:
    a power source (11, 20);
    an image data input for producing an image data;
    a light source (30) which is capable of emitting light with R, G, B components and to provide different levels of power; wherein the change in output power of the power source (20) is used to change the output power of the light source (30);
    a LCD panel (50) for modifying light rays from the light source (30) in accordance with said image data to produce light rays of an image;
    a projecting lens (60) for projecting the light rays from the LCD panel (50) onto a screen (70) through enlargement;
    a control circuit (81) for controlling an output of the power source so as to selectively set an output power:
    a correcting circuit (100) for correcting image data before being supplied to the LCD panel (50) so as to compensate the disturbance of the white balance caused by the change of the power of the light source (30),
    a counter (61) for counting an integrated on-state period of the light source; and
    a memory (51) for storing the integrated on-state period of the light source, which is connected to the counter and the control circuit;
    wherein the control circuit (81) changes the output of the power source (20) upon lapse of the integrated on-state period of the light source (30) stored by the memory (51) so as to keep luminance of the light source (30) constant.

2. An LCD projector as claimed in claim 1, wherein the correcting circuit (100) further corrects said image data so as to compensate the light intensity change caused by the relationship between the applied voltage and the transmissivity of the LCD panel (50).

3. An LCD projector as claimed in claim 1, wherein the correcting circuit (100) includes a plurality of look-up tables ($T_1$ to $T_n$) and a changeover switch (105) of effecting changeover of the look-up tables ($T_1$ to $T_n$).

4. An LCD projector comprising;
    a power source (21);
    a plurality of light sources (31) capable of emitting light with R, G, B components which are driven by the power source (21);
    an LCD panel (50) for modifying an image by receiving light rays from the light sources (31);
    a projecting lens (60) for projecting the image of the LCD panel (50) onto a screen through enlargement;
    a control circuit (81) for controlling the power source (21) so as to turn on the light sources (31) selectively, wherein the control circuit (81) selects order of priority of the light sources (31) when the light sources (31) are turned on selectively, and wherein the control circuit (81) determines the order of priority of the light sources (31) on the basis of integrated on-state periods of the light sources (31).

5. An LCD projector as claimed in claim 4, wherein the control circuit (100) determines, in accordance with brightness of a room in which the LCD projector is installed, how many ones of the light sources (31) should be turned on.

6. An LCD projector as claimed in claim 4, wherein said power source comprises a D/A converter (110) for receiving an output from the power source (21) and for producing different voltage levels.

7. An LCD projector as claimed in claim 4, further comprising:
    a correcting circuit (100) for correcting image data before being supplied to the LCD panel (50) so as to compensate the disturbance of the white balance caused by the change of the power of each of the light sources (31).

8. A method of controlling a plurality of light sources of an LCD projector so as to turn on the light sources selectively, comprising the steps of:

inputting to the LCD projector a signal on how many ones of the light sources should be turned on;

attempting to turn on all the light sources and making a decision on whether or not the number of useable ones of the light sources is not less than a predetermined number designated by the signal; and by selecting, on the basis of the decision, by priority in increasing order of integrated on-state periods of the light sources which ones of the light sources should be used, turning off those of the light sources, whose contribution is not required to reach a desired output power.

9. A method as claimed in claim 8, wherein the signal is produced by operating a remote control unit.

10. A method as claimed in claim 8, wherein the signal is produced by a sensor detecting brightness of a room in which the LCD projector is installed.

11. An LCD projector as claimed in claim 2, wherein the correcting circuit (100) includes a plurality of look-up tables ($T_1$ to $T_n$) and a changeover switch (105) for effecting changeover of the look-up tables ($T_1$ to $T_n$).

12. An LCD projector as claimed in claim 5, further comprising:

a correcting circuit (100) for correcting image data before being supplied to the LCD panel (50) so as to compensate the disturbance of the white balance caused by the change of the power of each of the light sources (31).

13. An LCD projector as claimed in claim 6, further comprising:

a correcting circuit (100) for correcting image data before being supplied to the LCD panel (50) so as to compensate the disturbance of the white balance caused by the change of the power of each of the light sources (31).

* * * * *